(12) United States Patent
Stark et al.

(10) Patent No.: US 9,091,598 B2
(45) Date of Patent: Jul. 28, 2015

(54) CIRCUITS FOR DETERMINING DIFFERENTIAL AND AVERAGE TEMPERATURES FROM RESISTIVE TEMPERATURE DEVICES

(75) Inventors: Terry Dean Stark, St. Louis Park, MN (US); Travis Edward Christle, Burnsville, MN (US); Francis J. Judson, Circle Pines, MN (US); Michael G. Miller, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 525 days.

(21) Appl. No.: 13/250,319

(22) Filed: Sep. 30, 2011

(65) Prior Publication Data
US 2013/0085709 A1  Apr. 4, 2013

(51) Int. Cl.
*G01C 19/66* (2006.01)
*G01K 3/14* (2006.01)
*G01K 3/06* (2006.01)
*G01K 7/24* (2006.01)

(52) U.S. Cl.
CPC .............. *G01K 3/06* (2013.01); *G01C 19/661* (2013.01); *G01K 3/14* (2013.01); *G01K 7/24* (2013.01)

(58) Field of Classification Search
USPC ......... 374/114, 141, 170–173, 100, 110, 112, 374/137, 163, 166, 183, 185, 117, 118, 119, 374/152, 130, 131, 132, 29, 45, 30, 115; 702/130, 94; 356/459
See application file for complete search history.

(56) References Cited

U.S. PATENT DOCUMENTS 3,186,229 A    6/1965  Liben
3,469,922 A *  9/1969  Koso et al. .................... 356/459
(Continued)

FOREIGN PATENT DOCUMENTS

DE    102009028958    3/2011
RU    2008633 C1 *    2/1994

OTHER PUBLICATIONS

Kester, "Section 2 Bridge Circuits", "Practical Design Techniques for Sensor Signal Conditioning", 1999, pp. 2.1-2.19, Publisher: Prentice Hall.

(Continued)

*Primary Examiner* — Gail Kaplan Verbitsky
(74) *Attorney, Agent, or Firm* — Fogg & Powers LLC

(57) ABSTRACT

Systems for determining differential and average temperatures from resistive temperature devices are provided. In one embodiment, a device comprises a bridge network including a first node and second node, wherein the first node receives a constant current from a current source; a first branch coupled between a first node and a second node, the first branch including a first temperature sensing element of a first resistive temperature device; a second branch coupled in parallel with the first branch between the first node and the second node, the second branch including a second temperature sensing element of a second resistive temperature device; a first output that provides a signal representing a difference between a voltage developed across the first temperature sensing element and a voltage developed across the second temperature sensing element; and a second output that provides a signal representing a voltage developed across first node and the second node.

17 Claims, 3 Drawing Sheets

(56) References Cited

U.S. PATENT DOCUMENTS

| | | | | |
|---|---|---|---|---|
| 3,683,671 | A * | 8/1972 | Van Swaay | 73/25.03 |
| 3,967,188 | A * | 6/1976 | Spencer | 323/367 |
| 4,035,081 | A * | 7/1977 | Sepp et al. | 356/459 |
| 4,143,549 | A | 3/1979 | Koehler | |
| 4,282,753 | A | 8/1981 | Davidson | |
| 4,411,527 | A | 10/1983 | Gamertsfelder et al. | |
| 4,722,406 | A * | 2/1988 | Naito | 177/50 |
| 4,867,567 | A | 9/1989 | Fidric | |
| 5,208,652 | A * | 5/1993 | Sonobe et al. | 356/460 |
| 5,400,141 | A | 3/1995 | Albers et al. | |
| 5,546,482 | A | 8/1996 | Cordova et al. | |
| 5,601,363 | A * | 2/1997 | Keil et al. | 374/45 |
| 5,786,895 | A * | 7/1998 | Mitchell et al. | 356/467 |
| 6,208,414 | B1 | 3/2001 | Killpatrick et al. | |
| 7,191,072 | B2 * | 3/2007 | Champion et al. | 702/50 |
| 8,504,311 | B2 * | 8/2013 | Smirnov et al. | 702/45 |
| 8,781,778 | B2 * | 7/2014 | Touchberry et al. | 702/94 |
| 2004/0102914 | A1 * | 5/2004 | More | 702/99 |
| 2005/0129083 | A1 * | 6/2005 | Rapoport et al. | 372/92 |
| 2005/0256659 | A1 | 11/2005 | Malvern et al. | |
| 2006/0052968 | A1 * | 3/2006 | Miller et al. | 702/127 |
| 2006/0133447 | A1 * | 6/2006 | Severson | 374/16 |
| 2010/0238450 | A1 | 9/2010 | Wang et al. | |
| 2011/0256709 | A1 * | 10/2011 | Zhang | 438/601 |
| 2012/0033225 | A1 * | 2/2012 | Salit et al. | 356/469 |

OTHER PUBLICATIONS

"NTC Thermistors", "Retrived from http://www.thermometrics.com/assets/images/ntcnotes.pdf", 1999, Publisher: Thermometrics, Inc.

Williams,"Bridge Circuits Marrying Gain and Balance", "Application Note 43", Jun. 1990, pp. AN43-1-AN43-48, Publisher: Linear Technology.

Jianqiang, "Abstract: The compensation methods of the start-up drift of four frequency differential laser gyro", "2010 2nd International Conference on Advanced Computer Control (ICACC)", Mar. 27, 2010, p. 1, Published in: Changsha, China.

Mohammad-Nejad et al, "Performance Modeling of Ring Laser Gyro in Inertial Navigation System", "Iranian Journal of Electrical & Electronic Engineering", Jul. 2006, pp. 82-90, vol. 2, No. 3 and 4.

Seon, "Abstract: The compensation method for thermal bias of ring laser gyro", "21st Annual Meeting of the IEEE Lasers and Electro-Optics Society", Nov. 9, 2008, Publisher: IEEE.

Wu et al, "Thermal Characteristics and Thermal Compensation of Four Frequency Ring Laser Gyro", "Position Location and Navigation Symposium", Aug. 7, 2002, pp. 271-276, Publisher: IEEE.

He et al, "Temperature Error Modeling Study for Laser Gyro", "Journal of Physics: Conference Series International Symposium on Instrumentation Science and Technology", 2006, pp. 245-249, No. 48, Publisher: Institute of Physics Publishing.

European Patent Office, "European Search Report from EP Application No. 12185926.8 mailed Feb. 18, 2014", "from Foreign Counterpart of U.S. Appl. No. 13/250,319", Feb. 18, 2014, pp. 1-3, Published in: EP.

European Patent Office, "Office Action from EP Application No. 12185926.8 mailed Feb. 27, 2014", "from Foreign Counterpart of U.S. Appl. No. 13/250,319", Feb. 27, 2014, pp. 1-9, Published in: EP.

European Patent Office, "European Office Action for Application Serial No. 12185926.8", "from Foreign Counterpart to U.S. Appl. No. 13/250,319", Feb. 5, 2015, pp. 1-5, Published in: EP.

U.S. Patent Office, "Notice of Allowance for U.S. Appl. No. 13/250,267", May 8, 2014, pp. 1-8, Published in: US.

U.S. Patent Office, "Office Action for U.S. Appl. No. 13/250,267", Oct. 25, 2013, pp. 1-19, Published in: US.

* cited by examiner

CIRCUITS FOR DETERMINING DIFFERENTIAL AND AVERAGE TEMPERATURES FROM RESISTIVE TEMPERATURE DEVICES

CROSS-REFERENCES TO RELATED APPLICATIONS

This application is related to co-pending U.S. application Ser. No. 13/250,267, entitled "SYSTEMS AND METHODS FOR THERMAL GRADIENT COMPENSATION FOR RING LASER GYROSCOPES", filed on even date herewith and herein incorporated by reference in its entirety.

BACKGROUND

Resistive temperature devices (RTD) are devices that have temperature sensing elements that vary in resistance as a function of temperature. Although the output response curves are non-linear in nature, precision temperature measurements can be readily obtained because an RTD's response will predictably follow the response curve. Measuring spatial differences in temperature using a pair of RTDs is challenging however, because simply knowing a difference in the resistances between two RTDs does not convey where either device is with respect to its response curve. As such this difference value cannot be used by itself to determine a temperature difference.

For the reasons stated above and for other reasons stated below which will become apparent to those skilled in the art upon reading and understanding the specification, there is a need in the art for circuits for determining differential and average temperatures from resistive temperature devices.

SUMMARY

The embodiments of the present invention provide circuits for determining differential and average temperatures from resistive temperature devices and will be understood by reading and studying the following specification.

Systems for determining differential and average temperatures from resistive temperature devices are provided. In one embodiment, a device comprises a bridge network including a first node and second node, wherein the first node receives a constant current from a current source; a first branch coupled between a first node and a second node, the first branch including a first temperature sensing element of a first resistive temperature device; a second branch coupled in parallel with the first branch between the first node and the second node, the second branch including a second temperature sensing element of a second resistive temperature device; a first output that provides a signal representing a difference between a voltage developed across the first temperature sensing element and a voltage developed across the second temperature sensing element; and a second output that provides a signal representing a voltage developed across first node and the second node.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is therefore not to be taken in a limiting sense.

Embodiments of the present invention provide means to determine accurately, with just a few number of parts, a differential temperature from two non-linear precision RTS temperature sensors (such as a platinum resistive temperature device (RTD), for example) by providing both a differential measurement and an average measurement from the two sensors.

Figure 1:
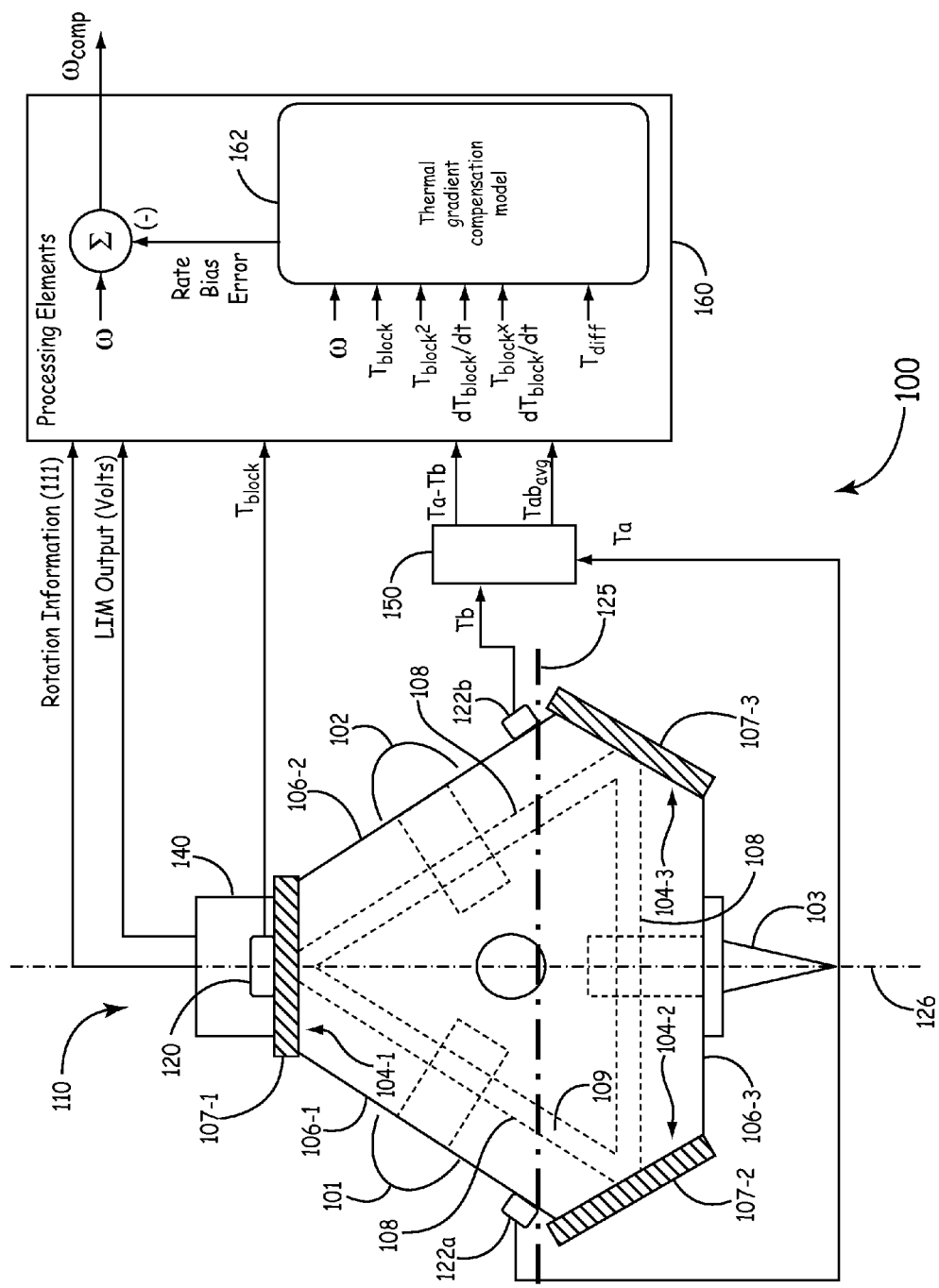
FIG. 1 is a diagram illustrating one embodiment of the present invention.

FIG. 1 is a simplified diagram of a ring laser gyroscope 100 of one embodiment of the present invention. Ring laser gyroscope 100 includes a laser block sensor 110 coupled to processing elements 160. In the embodiment of FIG. 1, laser block sensor 110 is triangular in shape having three sides (106-1, 106-2 and 106-3) and three blunted corners 107-1, 107-2 and 107-3. In other embodiment, laser block sensor 110 is formed from a different shape laser block sensor such as a four sided square, or a three-axis monolithic laser block. Examples of such are discussed in the Ser. No. 13/250,267 application herein incorporated by reference.

Laser block assembly 110 includes three electrodes 101, 102 and 103 each positioned on the respective sides 106-1, 106-2 and 106-3 of the laser block sensor 110. In one embodiment, electrodes 101 and 102 are cathodes and electrode 103 is an anode. In other embodiments, the laser block assembly may alternately include two anodes at 101 and 102, and a single cathode at 103. Mirrors 104-1, 104-2, and 104-3 are located as shown at the blunted corners 107-1, 107-2 and 107-3 of laser block sensor 110, located between each of the sides 106-1, 106-2 and 106-3. Within laser block sensor 110 is a cavity 108, which in conjunction with the mirrors 104-1, 104-2, and 104-3 forms a laser beam path enclosing an area within the laser block sensor 110. The performance of ring laser gyroscope 100 is observed by coupling optical energy information from the cavity 108 to a readout assembly 140. The readout assembly 140 provides voltage signals to processing elements 160 from which the difference frequency and hence rotation information may be obtained. In addition to the rotation information, the readout assembly 140, in this embodiment, also provides a voltage signal to processing elements 160 correlated with laser intensity called the Laser Intensity Monitor (LIM) output. This LIM output provides information regarding the optical energy within the cavity 108 of ring laser gyroscope 100. In one embodiment, cavity 108 is filled with a fill gas mixture 109 of Helium and Neon. In other embodiments, other fill gas mixtures are used within cavity 108.

One of ordinary skill in the art after reading this specification would appreciate that FIG. 1 illustrates a simplified block diagram that provides sufficient detail to facilitate an enabled written description of embodiments of the present invention. Additional details not shown regarding the physical structure and electronic circuitry associated with a laser block sensor for a ring laser gyroscope are considered within the knowledge and skill of one of ordinary skill in the art and are not discussed herein.

Ring laser gyroscope 100 further comprises at least one pair of resistive temperature device (RTD) temperature sensors 122a and 122b for calculating a spatial temperature gradient across a defined line 125 that traverses a portion of the laser block sensor 110. The defined line 125 is provided for illustrative purposes only and should not be interpreted to limit embodiments of the present invention to only the particular line shown in FIG. 1. In other implementations, line 125 would represent a gradient across any other alternate portion of the laser block sensor 110 with temperature sensors 122a and 122b placed for measuring the spatial temperature gradient across that alternate line appropriately.

In the embodiment shown in FIG. 1, ring laser gyroscope 100 further comprises a temperature sensor 120 for measuring a laser block temperature ($T_{block}$) of the laser block sensor 110. In other embodiments, values for the laser block temperature ($T_{block}$) may be obtained from Ta as measured by temperature sensor 122a, Tb as measured by temperature sensor 122b, or from a combination such as from an average of Ta and Tb.

Processing elements 160 are coupled to the rotation measurement output 111 of laser block sensor 110, coupled to temperature sensor 120, and coupled to temperature sensors 122a and 122b via circuit 150. Processing elements 160 includes a thermal gradient compensation model 162, which receives raw angular rate data (ω) generated from the Rotation Information 111 output of laser block sensor 110, laser block temperature measurements, $T_{block}$ (in this particular example provided by sensor 120), and temperature gradient ($T_{diff}$) data derived from temperature sensor 122a and 122b measurements. From these parameters, thermal gradient compensation model 162 estimates a Rate Bias Error.

In one embodiment, thermal gradient compensation model 162 comprises a linear regression having a plurality of coefficients (K) that correlate to parameters based on $T_{block}$ and $T_{diff}$. Examples of such models are described in the Ser. No. 13/250,267 application, incorporated herein by reference. For example, in one embodiment Rate Bias Error is derived by thermal gradient compensation model 162 using one or more equations equivalent to:

$$\text{Rate Bias Error} = K_1 + K_2 \times T_{block} + K_3 \times T_{block}^2 + K_4 \times dT_{block}/dt + K_5 \times T_{block} \times (dT_{block}/dt) + K_6 * T_{diff} \quad (\text{Eq. 1})$$

where the Rate Bias Error measurement is in angle/per unit time. As illustrated by this equations, in some embodiments, thermal gradient compensation model 162 also utilizes additional parameters ($T_{block}^2$, $dT_{block}/dt$ (the time derivative of $T_{block}$), and the product $T_{block} \times (dT_{block}/dt)$ each derived from the laser block temperature measurements ($T_{block}$). By subtracting this Rate Bias Error from the angular rate data (ω), processing circuitry 160 outputs the bias compensated rate ($\omega_{comp}$).

Temperature sensor 122a provides a first temperature measurement by varying its resistance as a function of the temperature it senses on laser block sensor 110 (denoted as Ta). Temperature sensor 122b provides a second temperature measurement by varying its resistance as a function of the temperature it senses on laser block sensor 110 (denoted at Tb). However, the RTD temperature sensors used for sensors 122a and 122b do not provide a linear output response to changes in temperature. For this reason, the temperature gradient measurements $T_{diff}$ used with thermal gradient compensation model 162 are not simply the difference between Ta and Tb but are instead a function of the difference Ta-Tb that is linearized using an average ($Tab_{avg}$) also derived from Ta and Tb.

Figure 2:
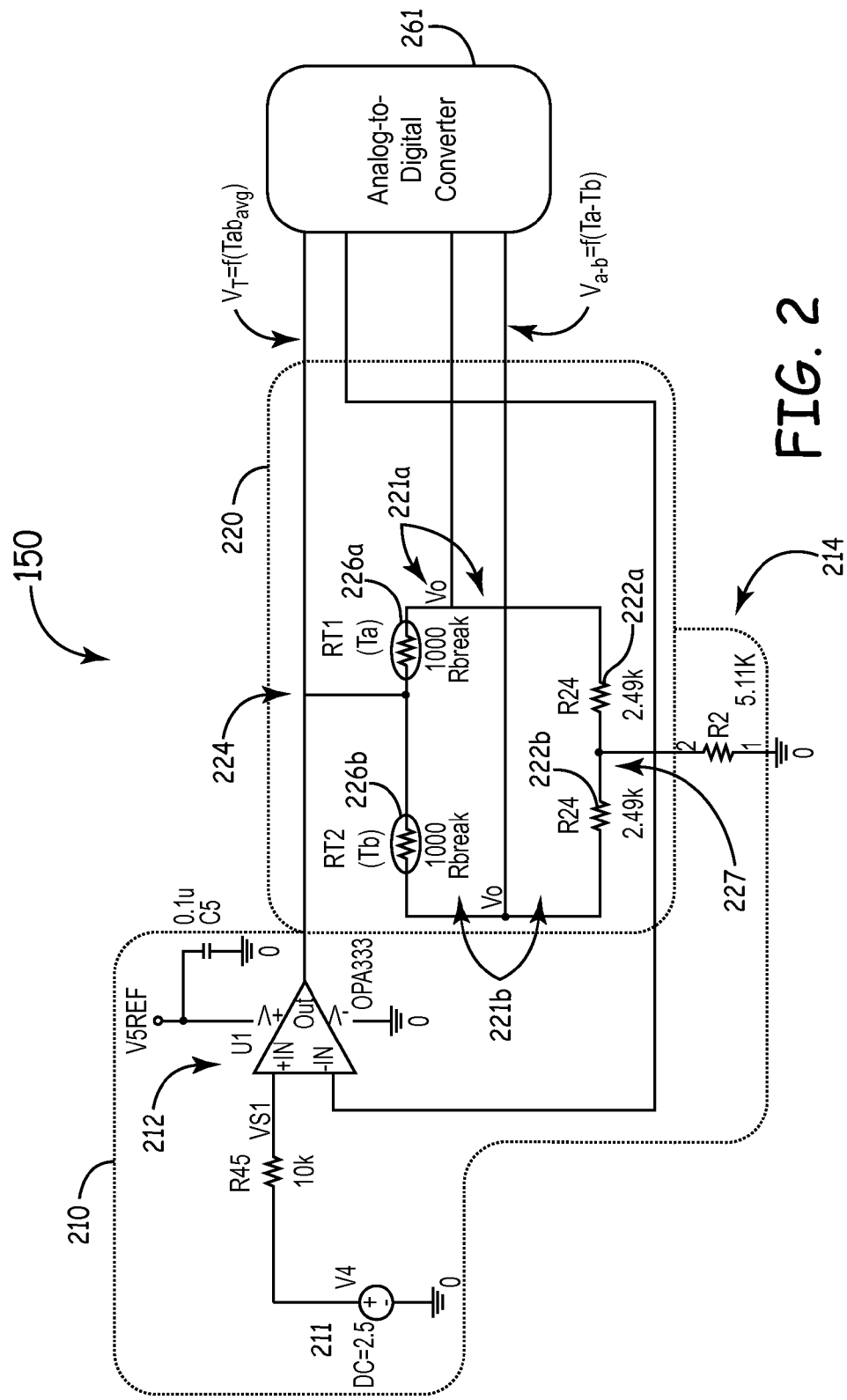
FIG. 2 is a diagram illustrating one embodiment of the present invention.

FIG. 2 is a schematic of a bridge circuit 150 for one embodiment of the present invention that senses the senses the Ta and Tb measurements from temperature sensors 122a and 122b and from them generates two output signals. Bridge circuit 150 uses a Wheatstone bridge circuit configuration comprising a stable current source 210 to supply a bridge network 220 which then measures a voltage difference between the two sensors 122a and 122b.

The first output signal, $V_{a-b}$, generated by bridge circuit 150 represents a difference between the raw temperatures measurements made by sensors 122a and 122b. A second output signal, $V_T$, generated by bridge circuit 150 provides an average of the raw temperatures measurements made by sensors 122a and 122b. The average $V_T$ is used by processing elements 260 to linearize the difference signal $V_{a-b}$ for the purpose of deriving values for $T_{diff}$.

Current source 210 is a precision current source that provides a constant precision current to a first node 224 of bridge network 220. Bridge network 220 has a first branch 221a that includes the temperature sensing element 226a of temperature sensor 122a. One end of temperature sensing element 226a is coupled to the first node 224. The other end is coupled to a precision resistor 222a. A second branch 221b of bridge network 220 includes the temperature sensing element 226b of temperature sensor 122b. One end of temperature sensing element 226b is coupled to first node 224 and the other end is couple to a second precision resistor 222b. The ends of the first precision resistor 222a and the second precision resistor 222b that are not coupled to the respective sensing elements 226a and 226b are coupled together at the second node 227 of bridge network 220.

Any difference in the current flow between branch 221a verses branch 221b is a function of a difference in the resistances of sensing elements 226a and 226b. The first and second precision resistors 222a and 222b are matched so that differences in their resistances do not themselves induce any difference in current flow between the branches. A test point in branch 221a (shown as Va) provides a voltage measurement at the junction where the first sensing element 226a is coupled to precision resistor 222a. Another test point in branch 221b (shown as Vb) provides a voltage measurement at the junction where the second sensing element 222b is coupled to precision resistor 222b. The difference between the voltages at Va and Vb provides the first output of bridge circuit 150 (shown at $V_{a-b}$). The difference between the voltage at the first node 224 and the second node 227 provides the second output of bridge circuit 150 (shown at $V_T$).

In operation, current source 210 supplies a constant precision current to first node 224 of bridge network 220 which splits between the parallel branches 221a and 221b and is recombined at second node 227. When the resistances in the branches 221a and 221b are equal, the current flowing through each of the branches will each be half of the current supplied to first node 224. Under these conditions, the voltage difference from Va to Vb will be zero.

As a temperature gradient develops across laser block sensor 110 along line 125, the temperatures measured at sensors 122a and 122b will begin to deviate from each other, causing the resistances of sensing elements 226a and 226b to also deviate from each other. As a result, the current supplied to node 224 will no longer be shared equally between branches 221a and 221b. A voltage difference will develop from Va to Vb which is output from bridge circuit 150 as $V_{a-b}$. The value of $V_{a-b}$ thus will vary as a function of the difference in temperatures measured by sensors 122a and 122b along line 125 across laser block sensor 110.

As mentioned above, because of the non-linear response characteristics of sensors 122a and 122b, the value of $V_{a-b}$ is not directly proportional to the $T_{diff}$ value that reflects the actual temperature gradient in degrees. That is, the value of $V_{a-b}$ must be linearized based on knowledge of the temperature at the laser block sensor 110. The second output of bridge circuit 150, $V_T$, provides this knowledge. In operation, as the constant current is supplied to the first node 224, the total current supplied to the bridge network 220 is known and constant. Variations that develop in the voltage $V_T$ are therefore a function of the total resistance of bridge network 220. Because the two sensing elements 226a and 226b are located in matching parallel branches, the voltage $V_T$ provides an indication of the average temperature (Tab$_{avg}$) being measured at sensing elements 226a and 226b. Accordingly, in one embodiment, the voltage $V_T$ is used by processing elements 160 to linearize the voltage $V_{a-b}$ which is then correlated (using the known response curves for sensors 122a and 122b) to a value $T_{diff}$ value that reflects the actual temperature gradient.

In the particular embodiment of FIG. 2, current source 210 comprises a precision DC voltage source 211 coupled to an operational amplifier ("op-amp"), shown at 212 and arranged as a current source with the DC voltage source 211 coupled to the non-inverting input of op-amp 212, the second node 227 of bridge network 220 providing a feedback signal to the inverting input of op-amp 212, and the output of op-amp 212 supplying current to the first node 224 of bridge network 220. In one embodiment, a bias resistor R2, shown at 214, is placed between the second node 227 and ground in order to limit the current through temperature sensing elements 226a and 226b so as to avoid self heating of those elements. The value for R2 can be readily determined by one of ordinary skill in the art after reading this specification by reference to current limit recommendations provided by the manufacturers of temperature sensors 122a and 122b. In one embodiment, R2 is specified such that less than 250 micro-amps will flow through either of sensing element 226a or 226b.

In one embodiment, the outputs $V_T$ and $V_{a-b}$ from bridge circuit 150 are coupled to processing elements 160. In one embodiment, processing elements 160 include at least one analog-to-digital converter 261 for sampling the outputs $V_T$ and $V_{a-b}$ into digital data. In one embodiment, analog-to-digital converter 261 is a multiplexing analog-to-digital converter with a selectable gain. For example, in one embodiment, the voltage $V_{a-b}$ may be much smaller in scale as compared to $V_T$. In that case, analog-to-digital converter 261 will apply a different gain to digital samples generated for $V_{a-b}$ that for digital samples generated for $V_T$. For example, in one embodiment, a gain of 1 is applied to digital samples for $V_T$ while a gain of 128 is applied to digital samples for $V_{a-b}$.

Figure 3:
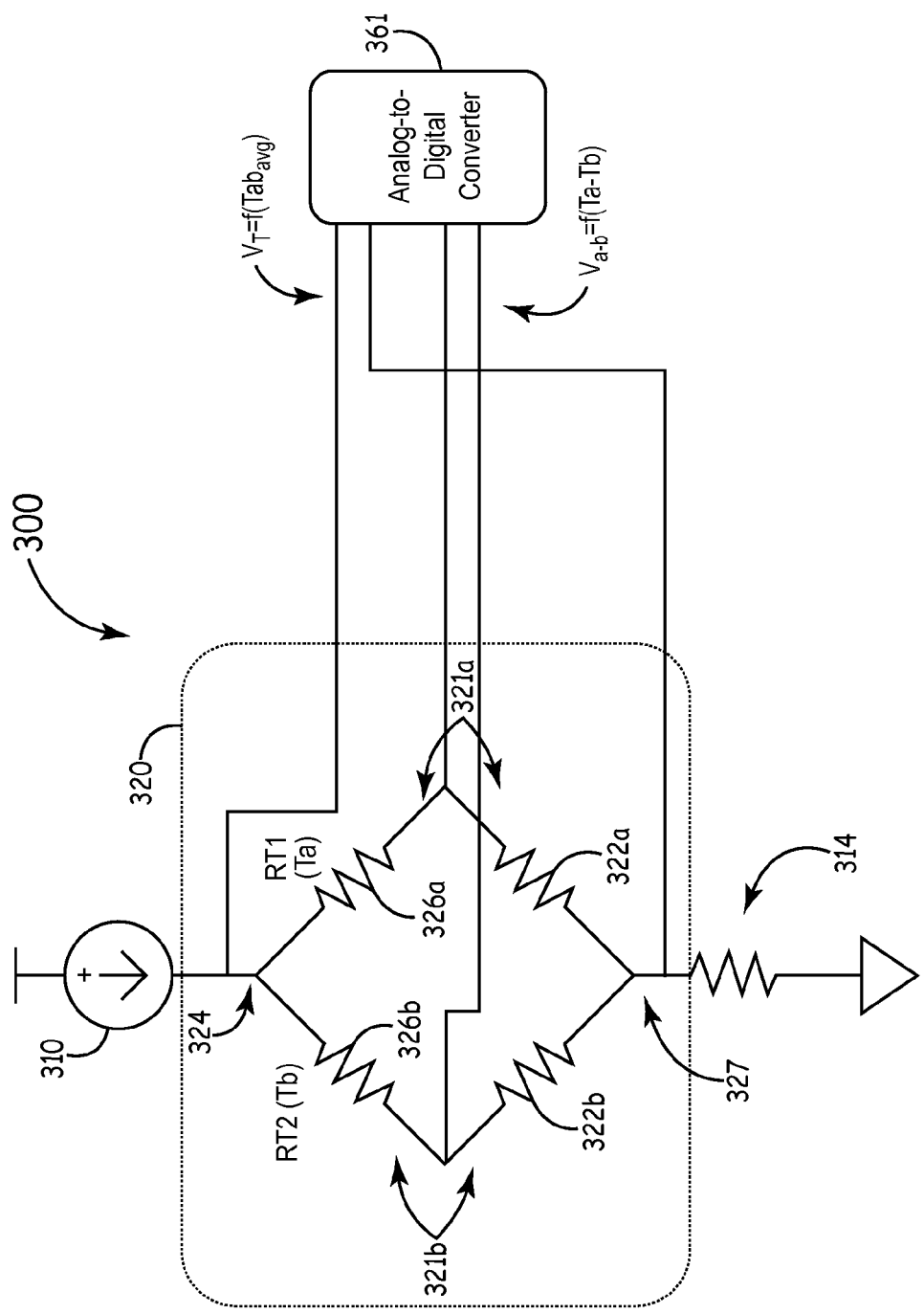
FIG. 3 is a diagram illustrating one embodiment of the present invention.

The particular internal details of current source 210 in FIG. 2 are for example purposes only. In other embodiment, other circuit configurations can be used to implement a current source for bridge network 220. For Example, FIG. 3 illustrates a bridge circuit 300 comprising a current source 310 coupled to a bridge network 320, coupled to a bias resistor 314. A first branch 321a of bridge network 320 is coupled between a first node 324 and a second node 327 of bridge network 320. The first branch includes the temperature sensing element 226a of a first resistive temperature device. A second branch 321b is coupled in parallel with the first branch 321a, between the first node 324 and the second node 327. The second branch 321b includes a second temperature sensing element 326b from a second resistive temperature device. A first output from bridge network 320 (shown as $V_{a-b}$) provides an output signal representing a difference between a voltage developed across temperature sensing element 326a and a voltage developed across temperature sensing element 326b. A second output from bridge network 320 (shown as $V_T$) provides an output signal representing the voltage that developed across first node 324 and the second node 327. In one embodiment, the outputs $V_T$ and $V_{a-b}$ from bridge circuit 320 are optionally coupled to at least one analog-to-digital converter 361 that samples the outputs $V_T$ and $V_{a-b}$ into digital data for further processing, such as described above, to determine a differential temperature measurement from the measurements from temperature sensing elements 326a and 326b.

In one embodiment in operation, current source 310 supplies a constant precision current to first node 324 of bridge network 320 which splits between the parallel branches 321a and 321b and is recombined at second node 327. When the resistances in the branches 321a and 321b are equal, the current flowing through each of the branches will each be half of the current supplied to first node 324. Under these conditions, the voltage $V_{a-b}$ will be zero. When a temperature gradient develops between temperature sensing elements 326a and 326b, the temperatures measured will deviate from each other, causing the resistances of sensing elements 326a and 326b to also deviate from each other. As a result, the current supplied to node 324 will no longer be shared equally between branches 321a and 321b and a voltage difference develops which is output from bridge network 320 as $V_{a-b}$. The value of $V_{a-b}$ thus will vary as a function of the difference in temperatures measured by temperature sensing elements 326a and 326b. Further, because the total current supplied to the bridge network 320 by current source 310 is known and constant, variations that develop in the voltage $V_T$ are a function of the total resistance of bridge network 320. Because the two sensing elements 326a and 326b are located in matching parallel branches, the voltage $V_T$ provides an indication of the average temperature being measured at sensing elements 326a and 326b.

Bias resistor 314 performs the same function as described with respect to resistor 214 in FIG. 2, to avoid self heating of the sensing elements 326a and 326b. Bias resistor 314 can be readily determined by one of ordinary skill in the art after reading this specification. In one embodiment, the resistance for bias resistor 314 is specified such that less than 250 microamps will flow through either of sensing element 326a or 326b.

Although the discussions above with respect to FIG. 1 disclose use of a bridge circuit 150 with respect to a laser ring gyroscope application, it will be appreciated by those of ordinary skill of the art that the techniques and circuits for obtaining temperature gradient measurements disclosed above with respect to FIGS. 2 and 3 are also applicable to any other application where a temperature gradient measurement is desired. For example, temperature sensing elements 326a and 326b can be located at any two points for which a temperature differential measurement is desired. Embodiments covering such other application are explicitly contemplated as within the scope of the present disclosure. As such, the full scope of embodiments of the present invention is not limited to laser ring gyroscope applications.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended to cover any adaptations or variations of the present invention. Therefore, it is manifestly intended that this invention be limited only by the claims and the equivalents thereof.

What is claimed is:

1. A circuit comprising:
   a current source;
   a bridge network including:
   a first node and a second node, the first node coupled to the current source;
   a first branch coupled between the first node and the second node;
   a second branch coupled in parallel with the first branch between the first node and the second node;
   wherein the first branch includes a first temperature sensing element of a first resistive temperature device in series with a first resistor;
   wherein the second branch includes a second temperature sensing element of a second temperature device in series with a second resistor;
   a first output that provides a signal representing a difference between a voltage developed across the first temperature sensing element and a voltage developed across the second temperature sensing element; and
   a second output providing a voltage representing a difference in voltage between the first node and the second node;
   wherein the first resistive temperature device and the second resistive temperature device are located within a ring laser gyroscope and positioned to measure a temperature differential across a laser block sensor of the ring laser gyroscope.

2. The circuit of claim 1, further comprising a voltage feedback from the second node of the bridge network to the current source.

3. The circuit of claim 1, further comprising at least one analog-to-digital converter coupled to the bridge network.

4. The circuit of claim 3, wherein an input of the analog-to-digital converter is coupled to the first output and wherein the analog-to-digital converter output a sample of the first output ($V_{a-b}$).

5. The circuit of claim 3, wherein an input of the analog-to-digital converter is coupled to the second output and wherein the analog-to-digital converter outputs a sample of the second output ($V_T$).

6. The circuit of claim 3, further comprising one or more processing elements, wherein the processing elements input digital samples of the second output ($V_T$) and digital samples of the first output ($V_{a-b}$) and calculate a temperature differential ($T_{diff}$) between the first resistive temperature device and the second resistive temperature device from the digital samples of the second output ($V_T$) and digital samples of the first output ($V_{a-b}$).

7. The circuit of claim 1, wherein the current source includes an amplifier comprising:
   a first input coupled to a DC power source;
   a second input coupled to the second node of the bridge network; and
   an output coupled to the first node of the bridge network.

8. The circuit of claim 1, further comprising a bias resistor coupled to the second node, the bias resistor generating a feedback to the current source to limit current flow through each of the first temperature sensing element and the second temperature sensing element.

9. The circuit of claim 1, wherein the first resistor and the second resistor are matched precision resistors.

10. A device comprising:
    a bridge network including:
    a first node and a second node, wherein the first node receives a constant current from a current source;
    a first branch coupled between a first node and a second node, the first branch including a first temperature sensing element of a first resistive temperature device;
    a second branch coupled in parallel with the first branch between the first node and the second node, the second branch including a second temperature sensing element of a second resistive temperature device;
    a first output that provides a signal representing a difference between a voltage developed across the first temperature sensing element and a voltage developed across the second temperature sensing element; and
    a second output that provides a signal representing a voltage developed across first node and the second node;
    wherein the first resistive temperature device and the second resistive temperature device are located within a ring laser gyroscope and positioned to measure a temperature differential across a laser block sensor of the ring laser gyroscope.

11. The device of claim 10, the first branch further comprising a first resistor in series with the first temperature sensing element; and
    the second branch further comprising a second resistor in series with the second temperature sensing element;
    wherein the first resistor and the second resistor are matched precision resistors.

12. The device of claim 10, wherein the current source receives a feedback signal from the second node of the bridge network.

13. The device of claim 12, further comprising a bias resistor sized to limit current flow through each of the first temperature sensing element and the second temperature sensing element to below a threshold.

14. The device of claim 13, wherein the bias resistor is coupled between the second node and ground.

15. The device of claim 10, further comprising at least one analog-to-digital converter coupled to the first output and the second output of the bridge network.

16. The device of claim 10, further comprising one or more processing elements, wherein the processing elements input digital samples of the second output ($V_T$) and digital samples of the first output ($V_{a-b}$) and calculate a temperature differential ($T_{diff}$) between the first resistive temperature device and the second resistive temperature device from the digital samples of the second output ($V_T$) and digital samples of the first output ($V_{a-b}$).

17. The device of claim 10, further comprising the current source, wherein the current source includes an amplifier comprising:
    a first input coupled to a DC power source;
    a second input coupled to the second node of the bridge network; and
    an output coupled to the first node of the bridge network.

* * * * *